March 13, 1934.  T. H. NOLL  1,950,511
ELECTRICALLY OPERATED STEAM GENERATOR FOR INDIVIDUAL HEATING UNITS
Original Filed May 19, 1927
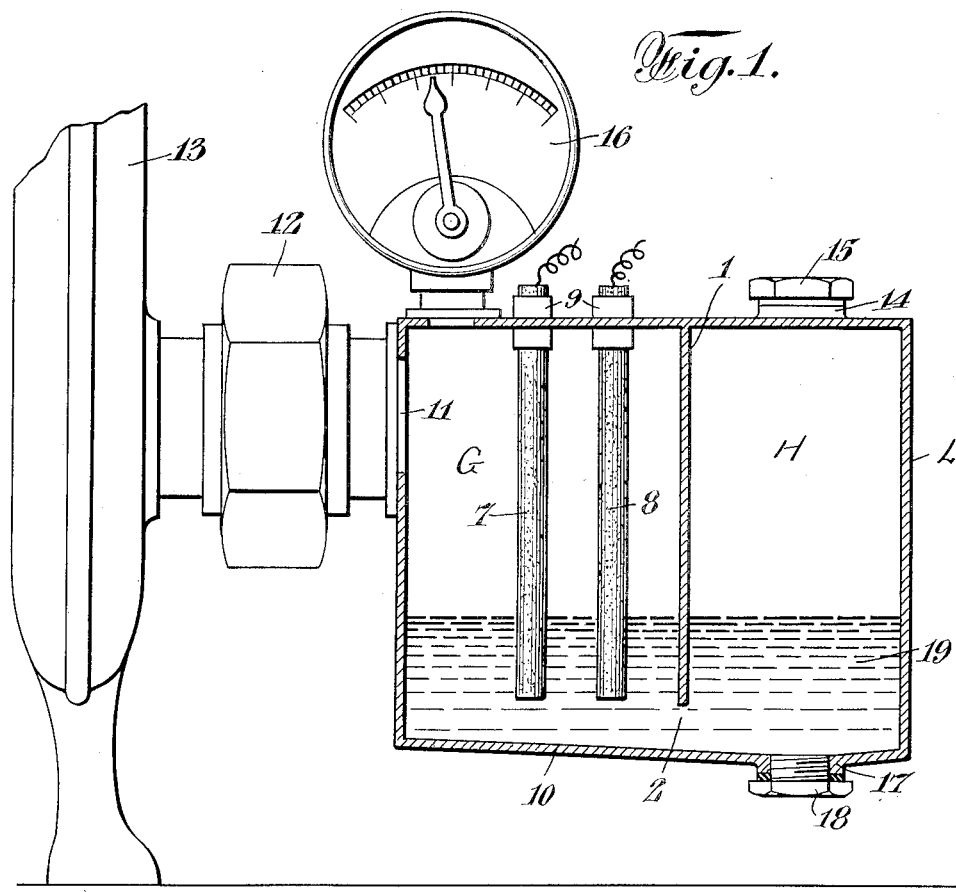
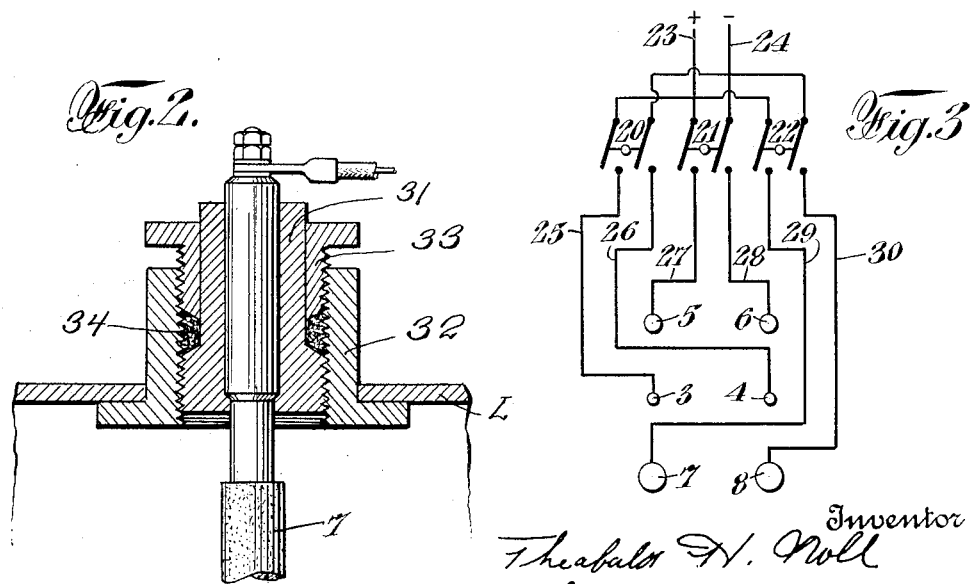

Patented Mar. 13, 1934

1,950,511

UNITED STATES PATENT OFFICE 1,950,511

ELECTRICALLY OPERATED STEAM GENERATOR FOR INDIVIDUAL HEATING UNITS

Theobald H. Noll, Bronx, N. Y.

Application May 19, 1927, Serial No. 192,766
Renewed February 25, 1931

4 Claims. (Cl. 219—40)

This invention relates to an improvement in electrically operated steam generator for an individual heating unit, such for instance as an ordinary standard steam radiator, and an object of the invention is to provide a steam generator which may be connected to or formed as a part of the heating unit and by which steam may be quickly and economically generated by electricity.

A further object is to so construct the device that the heating unit may be effective in automatically maintaining a constant temperature for the room in which it may be operating.

A further object is to so construct the device that the temperature of the room in which the heating unit is located may be raised or lowered at the will of the user.

A further and more detailed object is to embody the steam generator in a structure which is small and compact and which may be attached to any ordinary standard steam radiator and which when so attached will not detract from the general good appearance of the radiator.

Other objects and aims of the invention, more of less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a vertical sectional view through a steam generator constructed in accordance with this invention, and showing the same connected to a portion of a standard steam radiator.

Fig. 2 is an enlarged detail fragmentary sectional view illustrating the manner in which the electrodes may be vertically adjusted, and Fig. 3 is a diagrammatic view illustrating several sets of electrodes employed and the wiring and switch device therefor.

Referring to the drawing for describing in detail the structure which is shown therein, and bearing in mind that said structure is merely an exemplary embodiment of the features which go to make up the present invention, the reference character L indicates a main casing. A partition 1 divides the interior of this casing into two separate compartments as G and H, the only communication between said compartments being by means of an opening 2 through the lower portion of said partition.

Within the compartment G is arranged suitable electrodes as 3 and 4, 5 and 6, and 7 and 8, the several pairs being separated from each other preferably in substantially the manner as indicated in Fig. 2 of the drawing.

The electrodes comprising the pair 3—4 are relatively small, those comprising the pair 5—6 are relatively larger, and those comprising the pair 7—8 are progressively larger than the other pairs.

All of the electrodes preferably stand vertically within the compartment G and may be rigidly supported in position in any appropriate manner, as for instance by means of the insulating sleeves 9 illustrated in Fig. 1. The lower ends of the electrodes all project to near the bottom wall 10 of the casing but of course have no contact with said wall or any other portion of the casing.

At any suitable point in the upper portion of the compartment G is arranged an outlet opening 11 which is fitted with suitable means as for instance the coupling 12 by which the device may be placed in constant communication with the standard steam radiator illustrated at 13.

An opening as 14 may be provided in the upper portion of the casing, preferably in the upper portion of compartment H, by means of which water may be poured into the casing whenever desired. This opening is normally sealed however, as by means of the removable screw plug 15 shown therein.

If desired a suitable form of pressure gauge may be placed in communication with the upper portion of compartment G, as indicated at 16, and a clean-out opening 17 may if desired be provided through the bottom wall 10 by means of which water and sediment may be removed from the casing upon occasion. This opening is also normally sealed, as by means of a screw plug 18 illustrated.

In use the casing is partly filled with a suitable liquid as indicated at 19. The liquid found best adapted for use in this device is water impregnated with a solvent to increase its electric conductivity. A quantity of sodium chloride, approximately about one-quarter ($1/4$) of a teaspoonful to a cup of water has been found to be suitable for this purpose where the electric current fed to the electrodes is at approximately 110 volts. More or less of the salt may be used as the voltage of the current used is greater or less than that referred to.

It is to be here particularly noted however that the positive addition of the salt in definite quantity is of material importance in that it enables the use of small electrodes, enables the employment of only a small amount of liquid, and what is of prime importance it makes possible the generation of ample quantities of steam by these small electrodes and small quantity of liquid within a casing which is almost ridiculously small in comparison to the work which it performs in heating the relatively gigantic steam radiator 13.

The electric wiring and switch mechanism for supplying current to the several pairs of electrodes may take any desired form. That illustrated consists of three switch elements designated generally by the reference characters 20, 21 and 22. Each of these has its two blades electrically connected with the respective mains 23 and 24. The blades of switch element 20 are adapted to be manually moved into engagement with wires 25 and 26 which connect with the electrodes 3 and 4 respectively. The blades of switch element 21 are adapted to be manually moved into engagement with wires 27 and 28 which connect with the electrodes 5 and 6 respectively. The blades of switch element 22 are adapted to be manually moved into engagement with wires 29 and 30 which connect with the electrodes 7 and 8 respectively.

By the means as thus diagramatically illustrated it is possible, at the will of an operator, to energize any selected pair of electrodes by simply operating the switch mechanism to deliver current to that pair. It is possible further to energize any two or more pairs at the will of the operator, and here it may be noted that while three pairs of electrodes are shown, obviously any number of pairs may be employed, being either of graduated sizes or otherwise as may be desired, and each pair may be selectively operable either alone or with some other pair wholly at the will of the operator.

In operation the device is connected with the steam radiator 13 and the switch mechanism is manipulated to energize one or more pairs of electrodes. Usually the smallest pair as 3 and 4 being first energized. The electric current passing between the electrodes by way of the liquid 19 will heat said liquid and cause a steam vapor to rise therefrom into the upper part of the electrode compartment G and thence into the radiator 13 by way of opening 11. As the steam continues to accumulate and pressure is thus built up within the compartment G the level of the liquid in said compartment will be forced downwardly and will result in correspondingly raising the level within compartment H and against the air which is contained within said compartment H. The lowering of the level within compartment G will at the same time reduce the submerged surface extent of the electrodes and thereby correspondingly reduce the steam generating power of the electrodes. The lowering of the level of the liquid within compartment G will continue until a balanced condition is reached that is until the amount of steam being generated is just sufficient to supply the requirements of the radiator 13, it being noted that the rising of the liquid level in compartment H progressively increases the air pressure within said compartment so that at the time when the balanced condition referred to is reached there is a suitable pressure present in compartment G for the proper heating of the radiator 13 without the necessity for any great amount of depression of the liquid level in said compartment G. This feature is important in that it is one which lends toward maintaining the over-all dimensions of the entire mechanism within greatly restricted limits.

If the temperature of the room in which the device and its radiator is situated should fall or rise, condensation would occur more or less rapidly within the radiator, and in fact within compartment G, and the steam pressure within compartment G would be lowered or raised to a degree responsive to the room-temperature change. If the room-temperature falls, the pressure in compartment G would fall and the liquid level would rise and submerge an increased surface area of the electrodes, which would result in an increased production of steam to meet the conditions and maintain the temperature of the room. If the room-temperature rises, the pressure in compartment G would rise and the liquid level would be pressed further downwardly and free a greater part of the electrodes from the liquid, which would result in a decreased production of steam to meet the conditions and maintain the temperature of the room.

Also, as the room-temperature falls the air compressed within compartment H will become correspondingly condensed and permit a certain amount of relative rise of the liquid level in said compartment, while as the room-temperature rises the air within compartment H will become correspondingly expanded and cause a certain amount of relative depression of the liquid level in said compartment. It is noted that this relative movement of liquid level in compartment H is contrary to the movements of the liquid level in compartment G under the varying temperature conditions. A given change of room-temperature will of course have a much greater effect upon the steam pressure in compartment G than upon the air pressue in compartment H, but nevertheless the pressure change in compartment H for the given change of room-temperature will appreciably diminish the extent of movement of the liquid level in compartment G and thereby be conducive toward the important object of maintaining the over-all dimensions of the entire mechanism within minimum limits.

Whenever it is found that the maximum steam delivery of any one or more pairs of electrodes is insufficient for meeting existing conditions as to room-temperature or if it is desired to raise the room-temperature, it is simply necessary for the operator to manipulate the electric switch mechanism to deliver current to one or more additional pairs of electrodes. As above suggested the different pairs of electrodes may be of varying sizes, and hence of liquid heating capacities, and the operator may, by selection of pairs of appropriate sizes, produce any desired degree of liquid heating ability.

In originally starting operation of the mechanism described it is preferable to first energize a small pair of electrodes, as those indicated 3—4, and then as the liquid becomes gradually heated to throw in a pair which is next in point of size, and so on until the desired capacity is reached, but this procedure may of course be varied at the will of the operator.

The pairs of electrodes, in point of size, may be arranged in any relation, but preferably the pairs which are of smallest size should be arranged nearest the middle of the body of liquid in order that their restricted heating power may be appropriately distributed throughout the body of liquid.

The casing L may be of any construction, but preferably is formed of heavy sheet copper, or other noncorrosive material, and the partition 1 is preferably so disposed that the compartment H is appreciably smaller than the electrode compartment, said electrode compartment being only sufficiently large to accomodate in properly insulated relation the several pairs of electrodes and a small quantity of liquid to be heated thereby, and the compartment H is merely large enough to provide an air cushion above the liquid level therein, which air cushion is of a properly proportioned size relative to the area of compartment G so that the expansion and contraction of air therein will not too extensively effect the movement of the liquid level in compartment G.

The features hereinabove pointed out for preventing excessive movement of the liquid in compartment G may also be counted upon for preventing overloading of the electric circuit connected with the electrodes.

In actual practice it has been found that by following the principles as set forth herein an ample steam pressure may be readily maintained in any ordinary domestic steam radiator by making the generator of a size hardly larger than a man's fist. A casing measuring 3" x 3" x 4", and containing less than a dinner cup of liquid is ample for all ordinary purposes and is extremely economical in the consumption of electric current.

While the electrodes may be mounted so as to occupy permanent positions with respect to each other and with respect to the casing, it is preferable that they be adjustable, and to this end the illustration Fig. 2 suggests a form of mounting whereby the electrodes are independently adjustable. The mounting illustrated consists of an exteriorally threaded sleeve as 31 which is fixed permanently to the electrode and the threads of which engage the threads of an internally threaded thimble 32 fixed to the casing so that rotation of the sleeve will cause the electrode to be elevated or depressed to thereby dispose a greater or less portion of its length within the liquid.

A second sleeve as 33 may be arranged to surround an unthreaded portion of the first sleeve and to have threaded engagement also with the thimble 32, the second sleeve being useful in maintaining a steam tight engagement by means of the gasket material 34 which is interposed between opposing shoulder parts of the two sleeves.

As many changes could be made in this construction without departing from the scope of the invention as defined in the following claims, it is intended that all matter contained in the above description or shown in the accompanying drawing, shall be interpreted as illustrative only and not in a limiting sense.

Having thus described my invention, what I claim as new and desire to secure by Letters Patent is:—

1. In an electrically operated steam generator comprising a closed casing adapted to contain a quantity of conductive liquid, and electrodes depending into the liquid adapted when energized to heat the liquid by current passing through the liquid between them for generating steam within the casing effective to depress the liquid level about the electrodes and thereby automatically reduce the steam generating capacity of the generators, the combination therewith of means manually operable and independent of the liquid level with respect to the electrodes for altering the steam generating capacity of the generators.

2. In an electrically operated steam generator comprising a closed casing adapted to contain a quantity of liquid therein, steam generating means within said casing comprising a plurality of electrodes, and means whereby the steam generating capacity of the generator is automatically controlled by the pressure of steam generated by the electrodes within the casing, the combination therewith of means manually operable and independent of the steam pressure and of the liquid level with respect to the electrodes for altering the steam generating capacity of the generator.

3. In an electrically operated steam generator comprising a closed casing adapted to contain a quantity of liquid therein, steam generating means within said casing comprising a plurality of pairs of electrodes of different steam generating capacities, and means whereby the steam generating capacity of the generator is automatically controlled by the pressure of steam generated by the electrodes within the casing, the combination therewith of means manually operable and independent of the steam pressure for altering the steam generating capacity of the generator, said last means comprising a device manually operable to energize the pairs of electrodes selectively at will.

4. In an electrically operated steam generator comprising a closed casing adapted to contain a quantity of liquid therein, steam generating means within said casing comprising a plurality of electrodes, and means whereby the steam generating capacity of the generator is automatically controlled by the pressure of steam generated by the electrodes within the casing, the combination therewith of means manually operable and independent of the steam pressure for altering the steam generating capacity of the generator, said last means consisting in making said electrodes in pairs of different heating capacities and in providing a device manually operable to energize said pairs selectively at will.

THEOBALD H. NOLL.